United States Patent [19]

Ogawa

[11] Patent Number: 5,659,824
[45] Date of Patent: Aug. 19, 1997

[54] CAMERA WHICH STORES AND READS OUT PHOTOGRAPHIC DATA

[75] Inventor: Hidehiro Ogawa, Funabashi, Japan

[73] Assignee: Nikon Corporation, Tokyo, Japan

[21] Appl. No.: 491,767

[22] Filed: Jun. 19, 1995

[30] Foreign Application Priority Data

Jun. 17, 1994 [JP] Japan .................................. 6-135912

[51] Int. Cl.$^6$ .................................................. G03B 17/00
[52] U.S. Cl. ............................................................ 396/310
[58] Field of Search ..................... 354/410, 402, 354/400, 289.12; 396/125, 57, 65, 72, 81, 310, 207, 215, 219, 236

[56] References Cited

U.S. PATENT DOCUMENTS 4,200,369   4/1980   Richard et al. ........................... 396/551
5,300,978   4/1994   Miyasaka .................................. 396/300

*Primary Examiner*—D. Ruthledge

[57] ABSTRACT

A camera equipped with a storage processing unit to store photographic data in a memory device built into the camera. The storage processing unit includes a first memory control unit to set and store a start address value of the memory device to commence the storage of photographic data, a second memory control unit to variably set and store an end address value of the memory device to end the storage of the photographic data, and a third memory control unit for controlling storage of the photographic data in the memory device between the start address value and the end address value.

16 Claims, 7 Drawing Sheets

| | 5 | |
|---|---|---|
| 1 | STORAGE ITEM SETTING INFORMATION | STORAGE ITEM/STORAGE BYTE NUMBER INFORMATION |
| 2 | FILM NUMBER | FILM NUMBER INFORMATION |
| 3 | CURRENT ADDRESS | INFORMATION OF NEXT ADDRESS TO WRITE IN |
| 4 | START ADDRESS | BEGINNING ADDRESS INFORMATION FOR DATA READOUT |
| 5 | CURRENT FILM ADDRESS | BEGINNING ADDRESS INFORMATION OF FILM DURING PHOTOGRAPHY |
| 6 | STORAGE REGION TOP ADDRESS | PHOTOGRAPHIC DATA STORAGE TOP ADDRESS INFORMATION |
| 7 | STORAGE REGION BOTTOM ADDRESS | PHOTOGRAPHIC DATA STORAGE BOTTOM ADDRESS INFORMATION |
| | ⋮ | |
| TP | FILM NUMBER | FIRST FILM |
| | SHUTTER SPEED | PHOTOGRAPHIC DATA OF FIRST FRAME |
| | APERTURE VALUE | |
| | EXPOSURE MODE/ PHOTOMETRIC MODE | |
| | SHUTTER SPEED | PHOTOGRAPHIC DATA OF SECOND FRAME |
| | APERTURE VALUE | |
| | EXPOSURE MODE/ PHOTOMETRIC MODE | |
| | ⋮ | |
| | FILM END MARK | END OF FIRST SET OF PHOTOGRAPHIC DATA |
| | | SECOND FILM |
| | ⋮ | |
| BM | FILM END MARK | FINAL ADDRESS OF PHOTOGRAPHIC DATA STORAGE REGIONS |

| # | Field | Description |
|---|---|---|
| 1 | STORAGE ITEM SETTING INFORMATION | STORAGE ITEM/STORAGE BYTE NUMBER INFORMATION |
| 2 | FILM NUMBER | FILM NUMBER INFORMATION |
| 3 | CURRENT ADDRESS | INFORMATION OF NEXT ADDRESS TO WRITE IN |
| 4 | START ADDRESS | BEGINNING ADDRESS INFORMATION FOR DATA READOUT |
| 5 | CURRENT FILM ADDRESS | BEGINNING ADDRESS INFORMATION OF FILM DURING PHOTOGRAPHY |
| 6 | STORAGE REGION TOP ADDRESS | PHOTOGRAPHIC DATA STORAGE TOP ADDRESS INFORMATION |
| 7 | STORAGE REGION BOTTOM ADDRESS | PHOTOGRAPHIC DATA STORAGE BOTTOM ADDRESS INFORMATION |
| ⋮ | | |
| TP | FILM NUMBER | FIRST FILM |
| | SHUTTER SPEED | PHOTOGRAPHIC DATA OF FIRST FRAME |
| | APERTURE VALUE | |
| | EXPOSURE MODE/ PHOTOMETRIC MODE | |
| | SHUTTER SPEED | PHOTOGRAPHIC DATA OF SECOND FRAME |
| | APERTURE VALUE | |
| | EXPOSURE MODE/ PHOTOMETRIC MODE | |
| | ⋮ | |
| | FILM END MARK | END OF FIRST SET OF PHOTOGRAPHIC DATA |
| | | SECOND FILM |
| | ⋮ | |
| BM | FILM END MARK | FINAL ADDRESS OF PHOTOGRAPHIC DATA STORAGE REGIONS |

CAMERA WHICH STORES AND READS OUT PHOTOGRAPHIC DATA

BACKGROUND OF THE INVENTION

1. Field of the Invention

The present invention relates to a camera, or an entire camera system, which can efficiently store and efficiently read out photographic data in a memory device built into the camera.

In this specification, "camera system" means a system which includes, apart from the film, a lens, a stop, a microcomputer, and an electronic information storage device within a camera body, and a photographic data readout device.

2. Description of the Related Art

After a camera has taken photographs under various conditions, the necessity arises to know the photographic conditions in detail. To satisfy this kind of demand, the photographic conditions, comprising exposure time and aperture, have been stored for each photographic frame in a memory device comprising a semiconductor memory.

Because the photographic data can easily be printed out when read out from the memory device into a personal computer, a detailed investigation of the photographic data is possible while a photographer looks at the photographs to which the photographic data relate.

Figure 1:
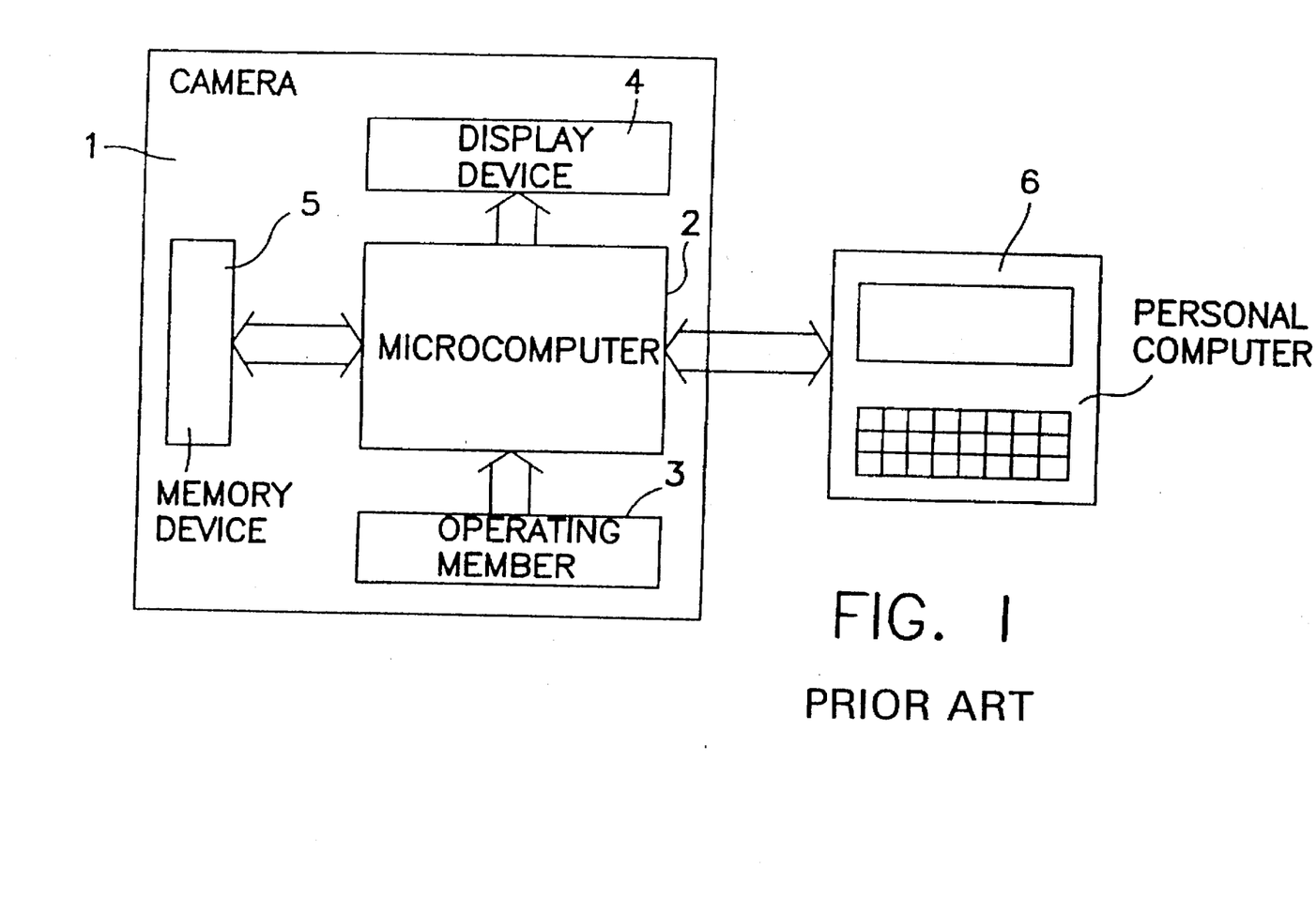
FIG. 1 is a block diagram showing a prior art camera system which stores photographic data.

A block diagram of a prior art camera system is shown in FIG. 1. The camera 1 has a microcomputer 2 which controls the operation of the camera, an operating member 3 of the camera 1, such as a release button, a display device 4 which performs a display of, for example, the photographic frame number of the film, a display of the date and display of the state of the battery, and a memory device 5 for photographic data. A personal computer 6 transfers various data to and from the camera 1.

When operating the operating member 3 and performing a photographic process, the photographic data are stored in the memory device 5 and a display can be output, as required, to the personal computer 6.

Figure 2:
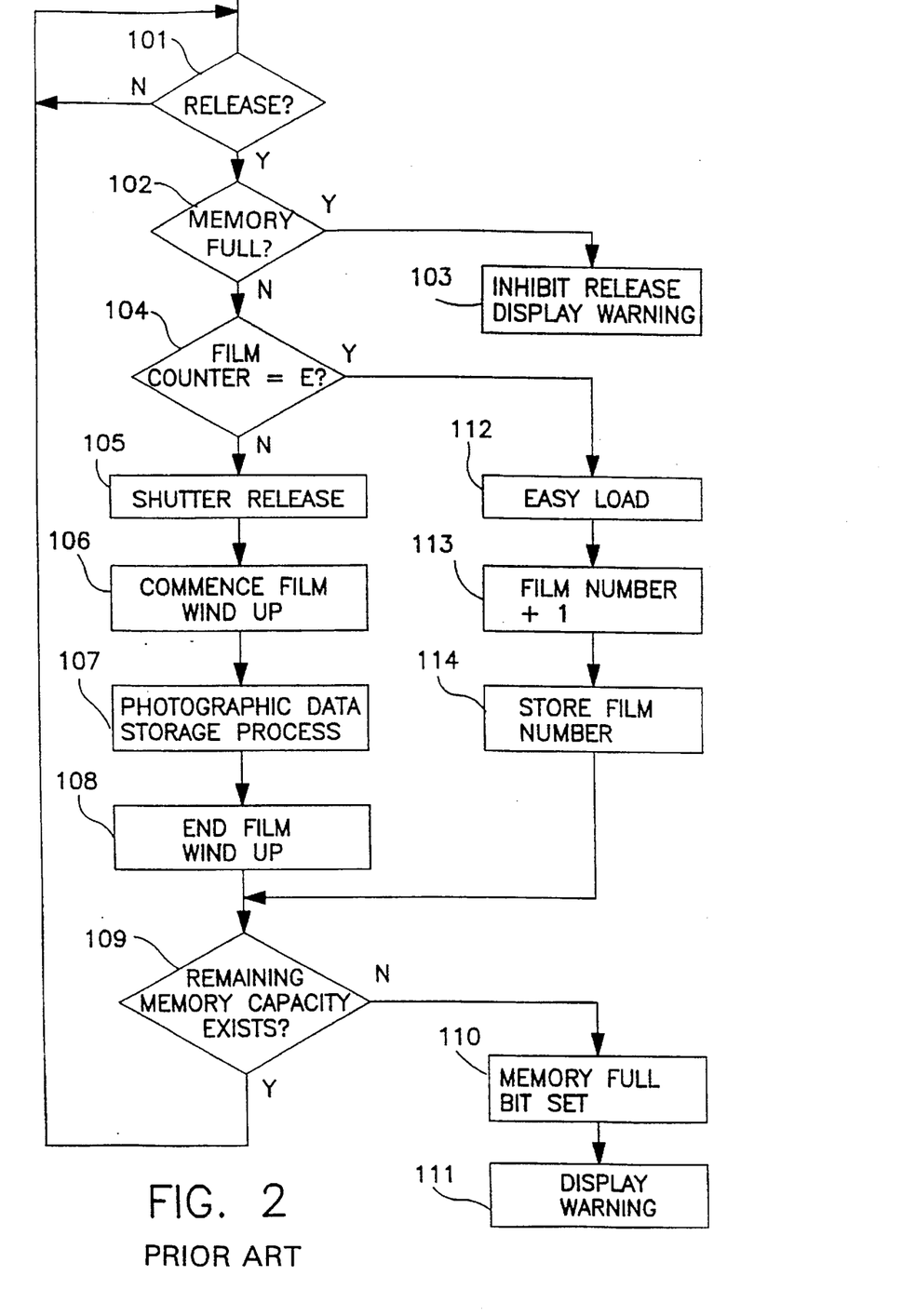
FIG. 2 is an operational flow chart of the time of storage of the photographic data stored in the camera system of FIG. 1.

FIG. 2 shows an operational flow chart relating to the process of storing photographic data in the camera system 1 of FIG. 1. In FIG. 2, the camera 1 detects, in step S101, whether or not the release button (for example, the operating member 3 shown in FIG. 1) has been depressed. When it has been detected that the release button has been depressed, the routing proceeds to step S102. In step S102, it is determined whether or not there is sufficient time for the memory device 5 (shown in FIG. 1), to store the photographic data. When there is sufficient time, the routine proceeds to step S104. When there is not sufficient time, namely in the case that the memory device 5 is full, the process advances to step S103, and a warning display is displayed and, in addition, the release action is inhibited.

In step 104, it is determined whether or not there is film loaded into the camera. Here, the film counter showing "E" indicates that there is no film loaded into the camera. When the film counter is other than "E", in step S105, the shutter is released. When the release has ended, proceeding to step S106, the operation of film windup is commenced. Then in step S107, the photographic data are stored in the memory device 5. Next, in step S108, the winding of one frame of film is detected and the windup process is ended.

Then, the remaining capacity of the memory device 5 is calculated in step 109. When the remaining capacity is less than a predetermined value, proceeding to step S110, this information is stored in a predetermined portion of the memory device 5, and in step S111, a warning is displayed. If the remaining capacity in step S109 is greater than the predetermined value, the routing returns to step S101, the routine for discriminating a release signal.

If the display of the film counter is "E" in step S104, the process proceeds to step S112, and film loading is performed. Normally, after the completion of film loading by the "easy load" method, the value of the film number is incremented by one in step S113 and stored in the memory device 5 in step S114. Next, the process proceeds to step S109, and the remaining capacity of the memory device is determined.

The camera is normally equipped with a large capacity memory device, more than is necessary to store all the photographic data, even in severe conditions and software is incorporated to perform information processing of the photographic data for this capacity.

When memory devices of different memory capacities are loaded into a conventional camera at the same time, because it is necessary to change the software to correspond to the hardware of the camera, there is the disadvantage that the price of the camera becomes high. Moreover, in these circumstances, outputting photographic data of the camera to an external source similarly has become a problem. The camera, or camera system, of the present invention overcomes these problems.

SUMMARY OF THE INVENTION

Accordingly, it is an object of the present invention to provide a camera with a memory device to store photographic data such that, when changing the memory device to one with a different memory capacity, it is not necessary to change the software at the same time.

Another object is to provide a camera system with a memory device to store photographic data such that photographic data, which is stored in the memory device, is output to an external source without changing the software, even in the case that the memory capacity is different.

Additional objects and advantages of the invention will be set forth in part in the description which follows and, in part, will be obvious in the description, or may be learned by practice of the invention.

The foregoing objects of the present invention are achieved by providing a camera equipped with a memory device to store photographic data and a storage processing unit which stores the photographic data in the memory device. The storage processing unit is equipped with a first memory control unit to set and store the address value of the memory device at which to start storage of the photographic data, a second memory control unit at which to variably set and store the address value of the memory device to end the storage of the photographic data, and a third memory control unit to control the photographic data such that the photographic data is stored in an address intermediate of the memory start address and the memory end address in the memory device.

The foregoing objects are also achieved by providing a camera system equipped with a photographic data readout device which reads out the photographic data stored in the memory device built into the camera to an external device, the photographic data readout device including a start readout address unit to read out a start address, an end readout address unit to read out an end address, and a data readout unit to read out the photographic data between the readout start address and the readout end address.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
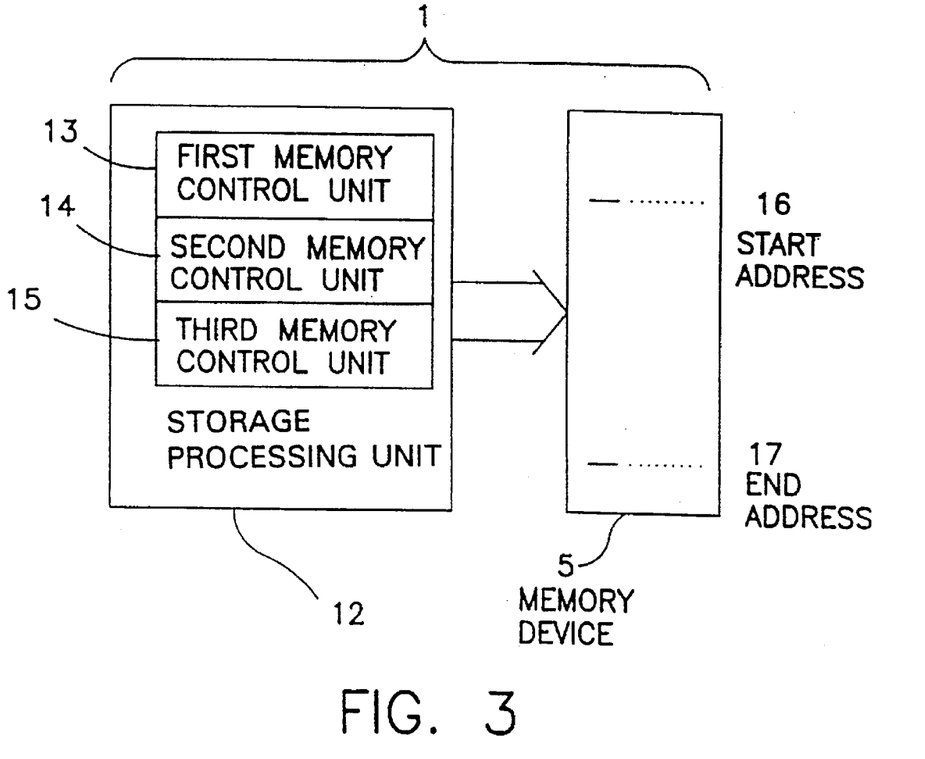
FIG. 3 is a diagram showing portions of a camera according to an embodiment of the present invention.

FIG. 3 is a schematic view showing a portion of a camera according to an embodiment of the present invention. The camera 1 includes a memory device 5 in which photographic data is stored and a storage processing unit 12 to store data in the memory device 5, the storage processing unit 12 having a first memory control unit 13, a second memory control unit 14, and a third memory control unit 15. A start address 16 indicates where to commence storing photographic data, and an end address indicates where to end the storage of photographic data. The memory device 5 is built into the camera.

When photography of a frame of the film has ended, the storage processing unit 12 first checks the region of the memory device 5 available for storage. The first process of the check is setting of the start address 16 of the photographic data (operation of the first memory control unit 13).

Next, the second process is to set the end address 17 (operation of the second control unit 14). This setting is performed for the photographic data in what may be referred to as the fundamental data storage unit comprising the memory device 5.

After the end of the above process, the third memory control unit 15 of the storage processing unit 12 causes storage of photographic data between the start address 16 and the end address 17 in the memory device 5.

A readout device which reads out and displays the photographic data stored in the memory device 5 may be connected to the camera by means of a signal transmission line, and reads out each address. The readout device reads and displays the start address and the end address, and after this, reads out the photographic data between the two addresses.

As a result, a change of the software becomes unnecessary with respect to the change of the capacity of the memory device 5, because the address process of the memory device 5 is quite simple. The storage processing unit 12, which includes the first through third memory control units 13, 14 and 15, is part of a microprocessor (not shown in the drawings) and takes into account the storage processing of address information, in particular, of the memory device 5. The process of the storage processing units 13, 14 and 15 is executed such as to set the storage address of the data to a predetermined value.

Figure 4:
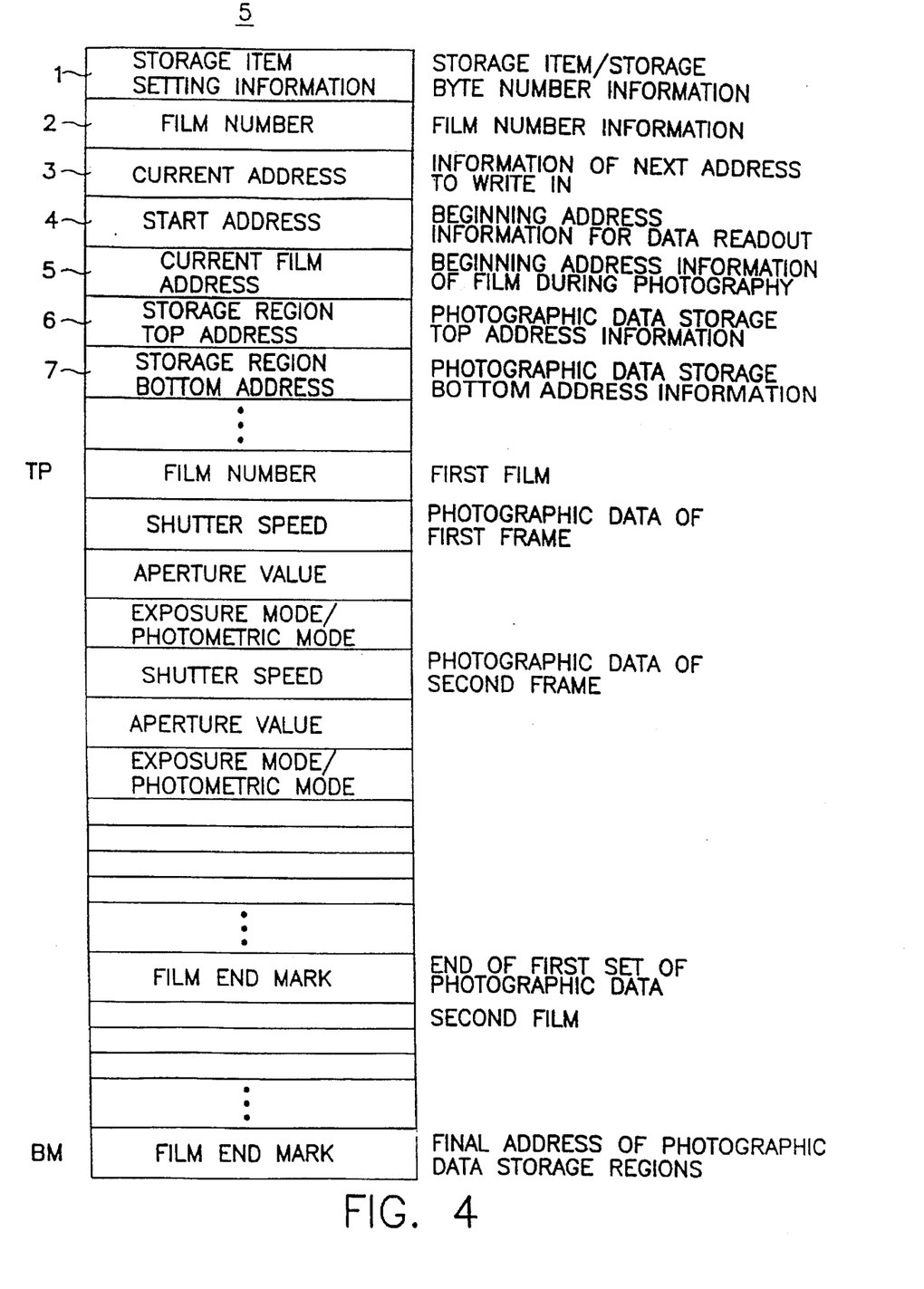
FIG. 4 is a diagram showing a storage device used in the camera of FIG. 3.

FIG. 4 shows an example of the memory device 5 used in a preferred embodiment of the present invention. Each region of the memory device is established, placing the addresses in the vertical direction. The setting information for the stored items is stored in the earliest number address in region (1). Moreover, film number information is stored in region (2) with this information being incremented by one for each change of the film.

Address information which is particularly important in the preferred embodiments of the present invention is stored in regions (3)–(5), and is address information which is written in so as to store photographic data in the memory device 5. Namely, region (3) is the current address, denoting the address in the memory device 5 in which the photographic data is to be next written. It is incremented by +1 for each byte of data written. The start address of region (4) is an address stored when newly starting the memory device 5, and is updated when readout or erasure of photographic data is performed. The current film address of region (5) is the initial address written in of the film during the present photography, and is updated at each film change.

Next, information is stored in region (6) relating to the initial address of the photographic data which is stored. Moreover, information is stored in region (7) relating to the last address of the photographic data which is stored. Here, because the values stored in regions (6) and (7) are determined by the capacity of the memory device 5 to store photographic data, they are values which are set at the time of factory shipping, and the user of the camera cannot optionally rewrite them.

The memory device 5 can be, for example, a "non-volatile memory". At present, the memory device 5 normally used has a capacity of 4 kB or 16 kB. For camera use, to store each kind of data, the information storage regions (1)–(6) in the first addresses of the memory device 5 are referred to as the fundamental data storage unit. Then in FIG. 4, the regions of the addresses denoted by the address TP and thereafter are regions in which camera data is caused to be stored. The address of the last of the regions of the memory device 5 which are capable of storage is denoted by the address BM. Accordingly, as mentioned above, in a memory device of 4 kB or 16 kB, the size of the storage region for photographic data differs, but there is practically no difference in the size of the initial maintenance region.

In the memory device 5 shown in FIG. 4, a description will be given for the case of commencing storage of photographic data from the state in which no photographic data is stored. All values of address "TP" are written as the address information in regions (3)–(5). When the operations are performed for loading a new film and winding up one frame, the microcomputer increments the film number in region (2) by +1 and, in addition, makes the current address value in region (3) the address ("TP"+1). Moreover, the data value of the film number is written at the address ("TP"). Then, at the end of one frame of photography, shutter speed data are written at the address ("TP"+1), the aperture value is written at the address ("TP"+2), and the exposure mode/ photometry mode is written at the address ("TP"+3). When this writing-in has ended, the current address value of region (3) is caused to change to ("TP"+4).

The case for a second frame is similar to that of the first frame. Because the writing of each kind of data is performed in succession, each of the items of photographic data is stored at address ("TP"+5) and thereafter. When proceeding in this manner, the photography of an entire roll of film is completed, and the film is rewound. At this time, to show the end of the photographic data of one roll of film, a film end mark is caused to be stored below the last address into which data has been written. Then, in region (5), the value of the current film address is next changed, the film end mark having been stored at the next address value. This value is a beginning value for storing the photographic data relating to the second roll of film.

Moreover, to embody this process in practical use, because the value of the current address in region (3) has become the address value showing the start of the second film, the address value in region (3) may be copied into region (5). Then, when the operations are performed for loading a second film and winding up one frame, the second film number is stored in region (2).

A summary of the changes of the address information which have been mentioned above is given below.

| | |
|---|---|
| (a) Initial state | |
| Current address (region (3)) | TP |
| Start address (region (4)) | TP |
| Current film address (region (5)) | TP |
| (b) When easy load of first film (empty windup) ends | |
| Current address | TP + 1 |
| Start address | TP |
| Current film address | TP |
| (c) When photographing frame n in same film (memory byte number per one frame = M) | |
| Current address | TP + 1 + n × M |
| Start address | TP |
| Current film address | TP |
| (d) When rewind of same film is complete (after photographing N frames) | |
| Current address | TP + 1 + (n × M) + 1 |
| Start address | TP |
| Current film address | TP + 1 + (n × M) + 1 |
| (e) When easy load of second film (empty windup) ends | |
| Current address | TP + 1 + (n × M) + 1 + 1 |
| Start address | TP |
| Current film address | TP + 1 + (n × M) + 1 |

The above is a description of the addresses when storing photographic data with respect to the memory device 5, but the case has been described in which the following three conditions are simultaneously satisfied:

(a) Storage of photographic data is completely absent from the memory device 5;

(b) The process operation of storage is carried out in the memory device 5 from the address TP;

(c) The memory device 5 capacity between the address TP and the address BM in the memory device is greater in comparison with the data mount of the photographic data.

The storage process of the preferred embodiments of the present invention changes the above prerequisite conditions: (a)→(A), (b)→(B). Namely, (B) The storage process of the photographic data may start from anywhere between the address TP and the address BM. The change process is effected by a next address value (the address BM+1) of the address BM to the address TP. Next, the address BM+2 to the address TP+1, and the following addresses similarly.

(A) Data from address TP, in the direction of address BM, is processed such that when a region which is available for storage exists, the remaining capacity of the memory device 5 including this region is calculated. That the region which is available for storage exists close to the address TP means that, because the process of reading the data has been performed as mentioned later, even data which remains may be considered as being superfluous, the state becoming one in which a so-called "data painting over process" is possible.

Then, just prior to performing the storage process, the storage commencement address is set as the start address of region (4). The first memory control unit 13 performs this function, namely, in the embodiment examples of this invention, it is part of a microcomputer.

Accordingly, the method of calculation of the remaining capacity in the memory device 5 is such that the remaining capacity=(value of start address)-(value of current address) +1 byte in the case that the start address>value of the current address, namely, (memory device region (4))>(memory device region (3)).

If the case becomes such that the value of start address<value of current address, namely, (memory device region (4))<(memory device region (3)), the remaining capacity becomes (value of BM-value of current address) +(value of start address-value of TP)+one byte.

The second memory control unit 14 performs a comparison of the magnitude of the value of the start address and the value of the current address, and the remaining capacity of the memory device is ascertained by performing either of the above-mentioned calculations. In the present embodiment, this control is performed by a part of the microcomputer. Because of this, in addition to the storage end address, it can be determined whether or not a storage process is possible in comparison with the amount of photographic data to be stored.

The third memory control unit stores the photographic data in the memory device based on the result of the control and determination by the first and second memory control units. This control process is performed by the microcomputer.

The process of storing photographic data in the memory device 5 corresponds to step S107 in FIG. 2, which shows the prior art technology, but in the preferred embodiment of the present invention, because of adding the process related to the address BM, a description is given below showing FIG. 5 as a flow chart.

Figure 5:
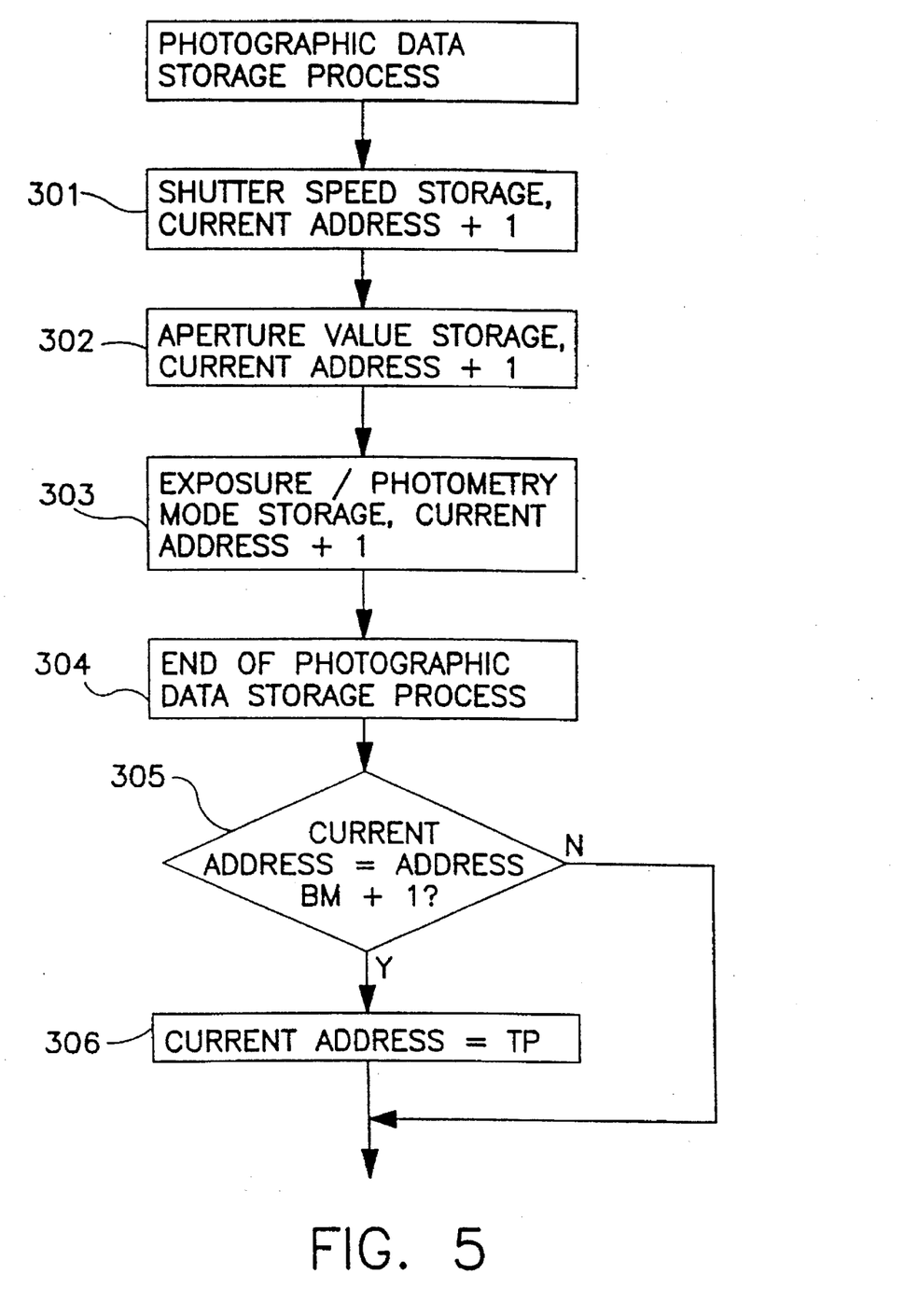
FIG. 5 is an operational flow chart of a microcomputer which processes the storage operations of a memory device shown in FIG. 4.

In FIG. 5, in step S301, after storing the shutter speed, the value of the current address is incremented by +1. In step S302, after storing the aperture value, the value of the current address is further incremented by +1. Moreover, in step S303, after storing the photometric mode/exposure mode, the current address is incremented by +1. Then step S304 proceeds to the end of storing photographic data. Here, during the incrementing of the current address by +1, in the case that the result exceeds the address BM of FIG. 4, a process is added to change the value of the current address to the address TP. Steps S305 and S306 show this kind of process.

Figure 6:
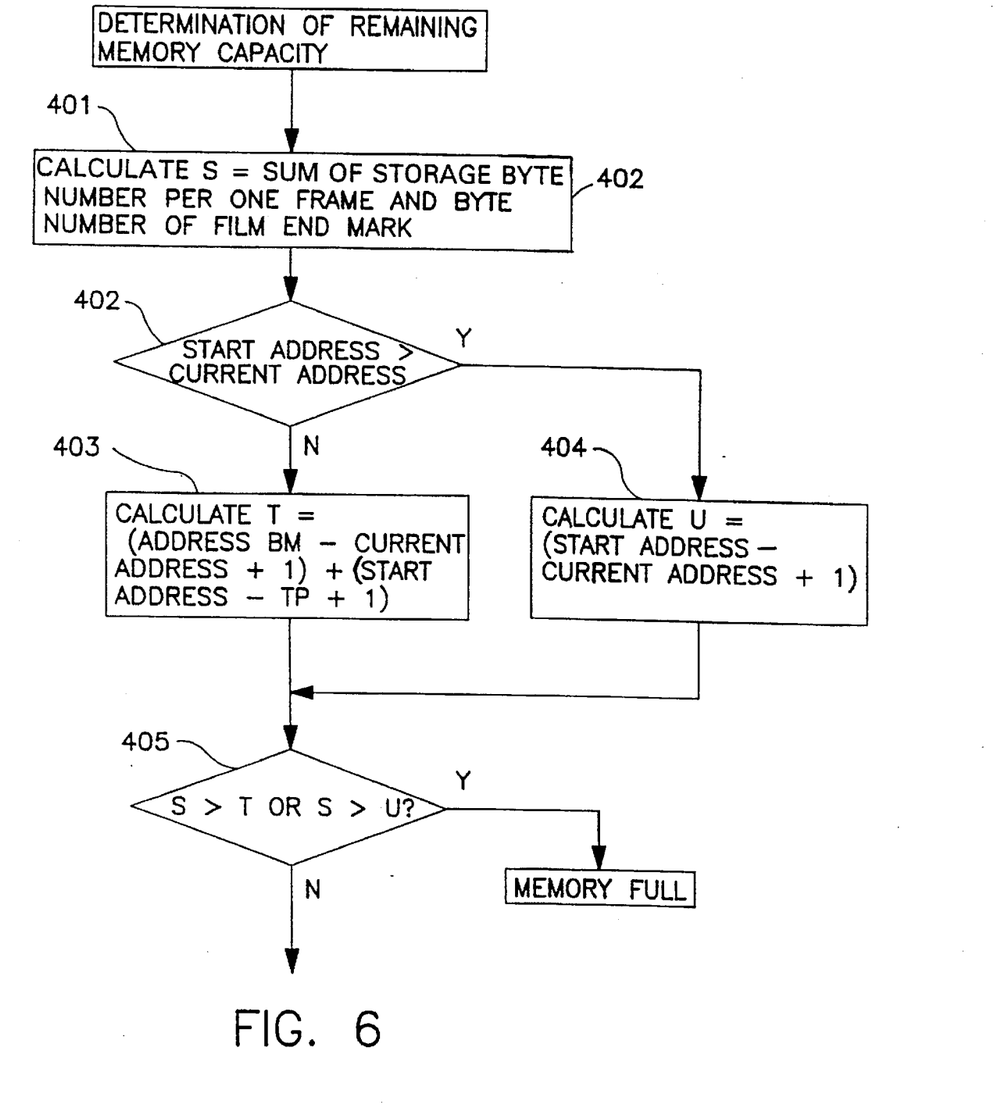
FIG. 6 is an operational flow chart for determining the remaining memory capacity of the memory device of FIG. 4.

Checking the remaining mount of memory capacity in a conventional process of the prior art camera system is shown in step 109 in FIG. 2, but FIG. 6 shows the operational flow chart according to the preferred embodiment of the present invention.

In step S401, a total S is calculated as the number of stored bytes per one frame and the number of bytes of the film end mark. Next, in step S402, the value of the start address and the value of the current address are compared.

When it is not the case that the start address>the current address, the routine proceeds to step S403, and when it is the case, the routine proceeds to step S404.

In step S403, the result of calculation by the following formula is set as T=((address BM−current address+1)+(start address−address TP+1)).

In step S404, the result of calculation by the following formula is set as U=(start address−current address+1).

Then, in step S405, the value of S is compared with the values of T and U. When it is the case that S>T or S>U, it is determined that the memory is full, and the routine proceeds to step S110 in FIG. 2. When it is not the case, the routine retrains to step S101 in FIG. 2.

The following description is given of the process of reading out, to an external source, the photographic data which is stored in the camera. During the photography of the second film, as shown in FIG. 4, the photography of the first film is ended. When the readout of the photographic data by the operation of a personal computer is commenced, the personal computer first shows the address information of the memory device 5. In actuality, the photographic data which can be read out is data of completed photography, and data of a film during photography is not read out. Reading out of the photographic data is effected by the three determinations mentioned below.

a. When (value of current film address)>(value of start address)
readout commencement address=start address
readout end address=current film address−1 b. When (value of current film end address)<(value of start address)
readout commencement address=start address
readout interruption address=address BM
readout restart address=address TP
readout end address=current film address−1 c. When (value of current film address)=(value of start address)
when memory full bit="1"
readout commencement address=start address
readout end address=current film address−1
when memory full bit="0"
photographic data is not stored.

When the process of reading out has ended with respect to the photographic data, the personal computer rewrites the address data of the memory device as described below. This is so that, if reading out of photographic data is caused after the memory has become full during photography, the storage of photographic data can be immediately recommenced.

The process is one of rewriting to the value of the current film address directly before reading out the start address, and furthermore clearing the memory full bit. Proceeding in this manner, when reading out photographic data, the storage of new photographic data becomes possible. At this time, by only rewriting the value of the start address to the value of the current film address, it becomes the same process as when the stored photographic data is erased.

Figure 7:
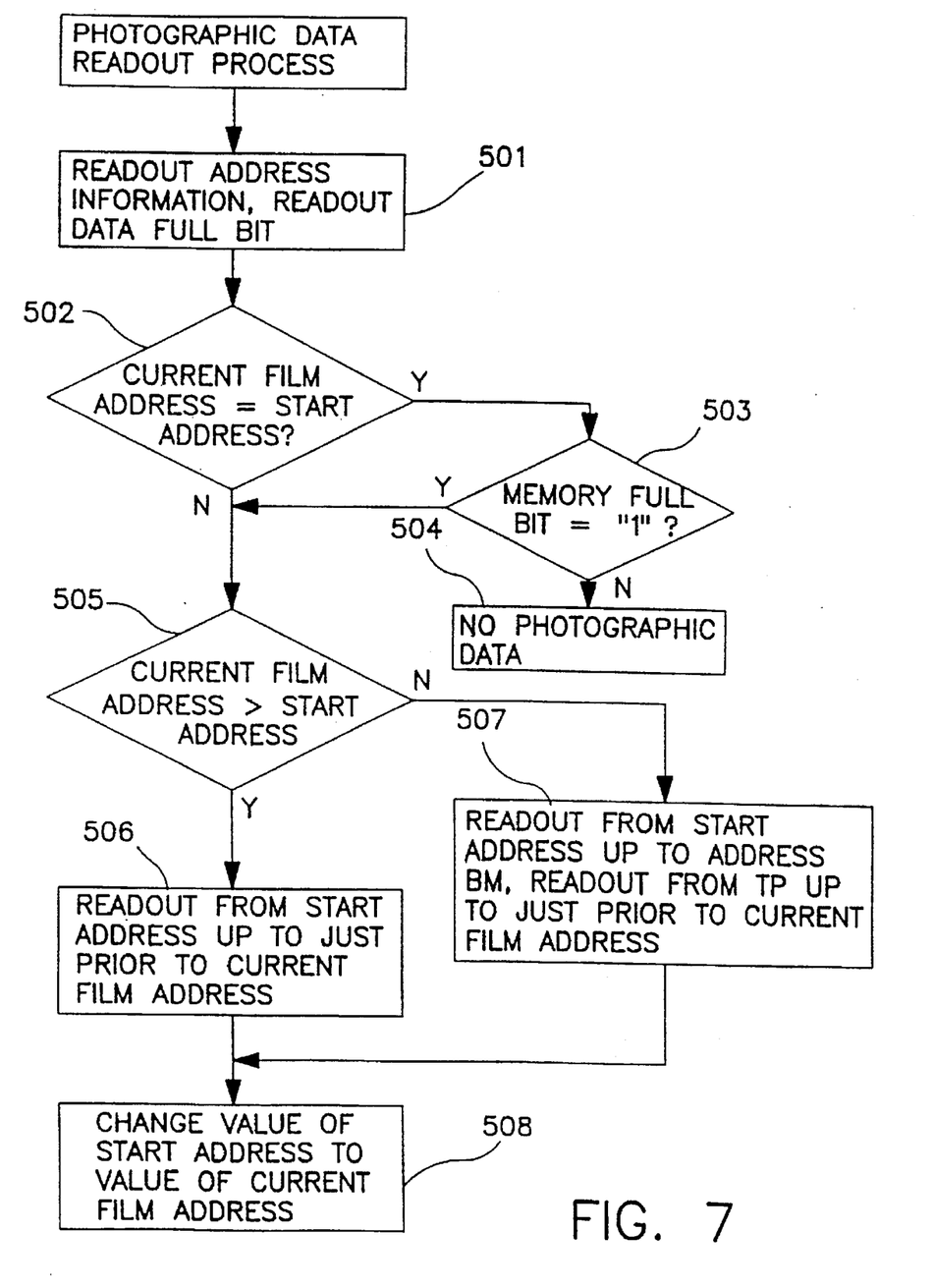
FIG. 7 is an operational flow chart of a readout process for the memory device of FIG. 4.

FIG. 7 is an operational flow chart for the above readout process. In FIG. 7, the address information and the data full bit are read out in step S501. Next, in step S502, it is determined whether or not the value of the current film address and the start address are the same. If they are the same, the routing proceeds to step S503, wherein it is determined whether the memory is full (memory full bit= "1"). When the memory is full (memory full bit="1"), the routine proceeds to step S505. When memory is not full (memory full bit="0"), the routine proceeds to step S504, and there is a display to the effect that there is no stored photographic data.

In step S505, a comparison is made of the value of the current film address and the value of the start address. When the value of the current film address>the value of the start address, the routine proceeds to step S506, and when the value of the current film<the value of the start address, the routine proceeds to step S507. Data is respectively read out in steps S506 and S507. In step S506, the photographic data is read out from the start address up to just prior to the current film address. In step S507, the photographic data is read out from the start address up to the address BM and read out from the address TP up to just prior to the current film address. The routine then proceeds to step S508. In step S508, the value of the current film address is changed to the start address. By doing this, the photographic data which has been read out from the memory device 5 is erased.

As has been described above for the preferred embodiments of the present invention, when the current memory device 5 is replaced with a larger one, the address value which is placed in storage corresponds to the maximum capacity in the region of the memory device (for example, region (7) in FIG. 4). Because of this, when a recording process is executed with regard to the photographic data, in order for the camera to perform control of the storage process knowing the value of the address BM, when only the storage capacity is varied, no change in the software of the microcomputer is necessary.

Similarly, even when photographic data stored in the camera is read out, because the readout range of the data can be determined from the values of the address TP and the address BM stored in the memory device 5, it is not necessary to change the software which performs the read-out process of the memory device 5.

If the memory device 5 is a non-volatile memory, even when the connection of the memory device 5 and the electric supply device is disconnected, it is not necessary to perform a process of non-erasure of data before film exchange and the like. Therefore, operation of the camera system is made easier.

The camera, according to the preferred embodiment of the present invention, stores address information relating to a range to store photographic data in a rewritable memory device. When a different memory device is used having a different capacity than the original memory device, a first memory control unit stores a start address and a second memory control unit stores an end address for photographic data in the memory device, and rewriting of the photographic data is made simple. The software in the camera and the device used for the reading out of the photographic data is not changed, and because of this, it is extremely convenient. The result is that the price for the camera and the device for reading out the photographic data, including the software, becomes inexpensive.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A camera system which stores photographic data pertaining to characteristics of photographs taken by the camera, the camera system comprising:

a memory to store the photographic data; and a storage processing unit to store a first address of said memory indicating a first storage location in said memory in which the photographic data may be stored, to store a second address of said memory indicating a last storage location in said memory in which the photographic data may be stored, and to control storage of the photographic data in said memory between the first and second addresses.

2. The camera system as claimed in claim 1, wherein said storage processing unit updates in said memory a current address for the next photographic data to be stored in said memory each time a piece of the photographic data is stored in said memory, and when the current address exceeds the second address, said storage processing unit sets a value of the current address equal to the first address.

3. The camera system as claimed in claim 1, wherein said storage processing unit updates in said memory a current address for the next photographic data to be stored in said memory, determines a start address indicating a beginning storage location for data readout of the photographic data, and determines whether remaining capacity exists in said memory for storing the photographic data of a frame of film in the camera system based upon said first, second and current addresses, said storage processing unit updating the start address in response to the data readout and erasure of the photographic data from said memory.

4. The camera system as claimed in claim 3, wherein said storage processing unit determines whether the remaining capacity of said memory exists by determining a sum of stored bytes of the photographic data required for one frame and a number of bytes required to indicate a film end mark of the film, comparing the sum to a first total (the second address−the current address+2 bytes of said memory+the start address−the first address) if the current address is at least as great as the start address, and comparing the sum to a second total (the start address−the current address+1 byte of said memory) if the start address is greater than the current address.

5. The camera system as claimed in claim 2, wherein said storage processing unit determines a start address indicating a beginning storage location for data readout of the photographic data, and determines whether remaining capacity exists in said memory for storing the photographic data of a frame of film in the camera system based upon said first, second, start and current addresses.

6. The camera system as claimed in claim 5, wherein said storage processing unit determines whether the remaining capacity of said memory exists by determining a sum of stored bytes of the photographic data required for one frame and a number of bytes required to indicate a film end mark of the film, comparing the sum to a first total=(the second address−the current address+2 bytes of said memory+the start address−the first address) if the current address is at least as great as the start address, and comparing the sum to a second total=(the start address−the current address+1 byte of said memory) if the start address is greater than the current address.

7. The camera system as claimed in claim 6, wherein said storage processing unit determines that the remaining capacity does not exist when the sum is one of greater than the first total and greater than the second total.

8. The camera system as claimed in claim 3, further comprising:
a photographic data readout device to read out, from said memory, the first and second addresses, and to transmit the readout photographic data to an external device.

9. The camera system as claim in claim 8, wherein:
said memory stores the current address for the next photographic data to be stored in said memory; and
said photographic data readout device readouts out the photographic data from the start address to a current film address, indicative of a beginning address of the photographic data of the film of the present photography written in said memory and updated at each film change, if the current film address is greater than the start address, and readouts out the photographic data from the start address to the second address and from the first address to a byte prior to the current film address if the start address is at least as great as the current film address.

10. The camera as claimed in claim 9, wherein said photographic readout device changes the current film address to equal the start address in said memory after the photographic data is read out from said memory.

11. The camera system as claimed in claim 4, further comprising:
a photographic data readout device to read out, from said memory, the first and second addresses, and to transmit the readout photographic data to an external device.

12. The camera system as claim in claim 11, wherein:
said memory stores a current film address indicative of a beginning address of the photographic data of the film of the present photography written in said memory and updated at each film change; and
said photographic data readout device readouts out the photographic data from the start address to the current film address if the current film address is greater than the start address, and readouts out the photographic data from the start address to the second address and from the first address to a byte prior to the current film address if the start address is at least as great as the current film address.

13. The camera as claimed in claim 12, wherein said photographic readout device changes the current film address to equal the first address in said memory after reading out the photographic data from said memory.

14. A camera system which stores photographic data pertaining to characteristics of photographs taken by the camera system, the camera system comprising:
a memory to store the photographic data; and
a photographic data readout device to read out, from said memory, a first address indicating a first storage location in said memory in which the photographic data may be stored, and a second address of said memory indicating a last storage location in said memory in which the photographic data may be stored, and to read out the photographic data between the start and end addresses, and to transmit the read out photographic data to an external device.

15. The camera system as claim in claim 14, wherein:
said memory stores a start address indicating a beginning storage location for data readout of the photographic data and a current film address indicative of a beginning address of the photographic data of the film of the present photography written in said memory and updated at each film change; and
said photographic data readout device readouts out the photographic data from the start address to the current film address if the current film address is greater than the start address, and readouts out the photographic data from the start address to the second address and from the first address to a byte prior to the current film address if the start address is at least as great as the current film address.

16. The camera as claimed in claim 15, wherein said photographic readout device changes the current film address to equal the start address in said memory after the photographic data is read out from said memory.

* * * * *

UNITED STATES PATENT AND TRADEMARK OFFICE
CERTIFICATE OF CORRECTION

PATENT NO. : 5,659,824
DATED : August 19, 1997
INVENTOR(S) : Hidehiro OGAWA

It is certified that error appears in the above-identified patent and that said Letters Patent is hereby corrected as shown below:

Title page, [56] References Cited: add "4,329,029 5/1992 Haskell 354/28912".

Signed and Sealed this

Twenty-third Day of December, 1997

Attest:

BRUCE LEHMAN

Attesting Officer

Commissioner of Patents and Trademarks